United States Patent [19]
Tracy et al.

[11] Patent Number: 5,945,393
[45] Date of Patent: Aug. 31, 1999

[54] NONIONIC GEMINI SURFACTANTS

[75] Inventors: David James Tracy; Ruoxin Li, both of Plainsboro; Manilal S. Dahanayake, Princeton Junction; Jiang Yang, Plainsboro, all of N.J.

[73] Assignee: Rhodia Inc., Cranbury, N.J.

[21] Appl. No.: 08/966,270

[22] Filed: Nov. 7, 1997

Related U.S. Application Data

[62] Division of application No. 08/756,872, Nov. 26, 1996.

[51] Int. Cl.$^6$ .............................. C11D 1/72; C11D 1/722; C07C 43/205; C07D 241/04
[52] U.S. Cl. .......................... 510/413; 510/421; 510/535; 516/68; 516/76; 516/916; 516/920; 568/583; 568/607; 568/606; 568/619; 544/401; 564/123; 564/201
[58] Field of Search ...................................... 252/351, 331; 568/606, 609, 607, 648, 651, 583, 619; 510/413, 421, 535; 544/401; 564/123, 139, 152, 201, 203; 516/68, 69, 71, 76, 915, 916, 920

[56] References Cited

U.S. PATENT DOCUMENTS

| | | | |
|---|---|---|---|
| 2,843,568 | 7/1958 | Benning et al. | 568/607 |
| 3,293,191 | 12/1966 | Carpenter et al. | 252/351 |
| 3,335,191 | 8/1967 | Brack | 568/648 |
| 4,234,444 | 11/1980 | Wegener et al. | 510/413 |
| 4,418,217 | 11/1983 | Schmid et al. | 252/351 |
| 4,814,394 | 3/1989 | Barthold et al. | 252/331 |
| 4,836,951 | 6/1989 | Totten et al. | 510/220 |
| 5,643,854 | 7/1997 | Li et al. | 510/499 |
| 5,710,121 | 1/1998 | Tracy et al. | 510/467 |

*Primary Examiner*—Richard D. Lovering
*Assistant Examiner*—Daniel S. Metzmaier
*Attorney, Agent, or Firm*—Craig M. Bell

[57] ABSTRACT

Novel nonionic gemini surfactants are extremely effective emulsifiers for oil-in-water emulsions that provide improved detergency at even low concentration levels. The surfactants are characterized by the formula:

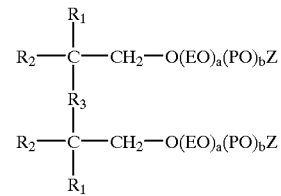

I.

wherein $R_1$ is independently H or a $C_1$ to $C_{22}$ alkyl, $R_2$ is $C_6$ to $C_{22}$ alkyl and $R_3$ is $D_1$—$R_4$—$D_1$ or $R_4$—$D_1$—$R_4$ wherein $R_4$ is independently a $C_1$–$C_{10}$ alkyl group, —O—$R_5$—O—, or aryl, e.g. phenyl, and $D_1$ is independently —O—, an amide group [—C(O)N($R_6$)—], an amino group [—N($R_6$)—], —O—$R_5$—O—, or aryl. $(EO)_a(PO)_b$ is a polyether group and Z is a $C_1$–$C_4$ alkyl, or an alkylaryl or hydrogen wherein EO represents ethyleneoxy radicals, PO represents propyleneoxy radicals, a and b are numbers of from 0 to 100, a is preferably from about 0 to about 30 and b is preferably from about 0 to 10, wherein a plus b is at least one, and the EO and PO alkyl or alkylaryl.

14 Claims, No Drawings

NONIONIC GEMINI SURFACTANTS

RELATED APPLICATIONS

The present application is a divisional application of U.S. Ser. No. 08/756,872 filed on Nov. 26, 1996, pending.

BACKGROUND OF THE INVENTION

This invention relates to improved surfactants useful as emulsifiers and in detergents and personal care products at very low concentrations.

Emulsification is an extremely important technology and it is a process which is used in detergency, emulsion polymerization, cosmetics, food, agrochemicals, paints, paper, transportation of crude oil, etc. Emulsifiers function as essential ingredients in personal care and household products; industrial and institutional cleaners including shampoos, car washes, carpet shampoos, hand dishwashing liquids, latex foaming and oil recovery compositions; and the like.

In order to form a relatively stable emulsion, an emulsifier is required to adsorb at an oil-water interface to prevent emulsion droplet coalescence. The majority of emulsifiers are synthetic surfactants or natural products with amphiphilic character. Presently, usage levels of surfactants for effective emulsification are usually above 0.1% active based on the total weight of the detergent solution which is used in the final use composition. For a given emulsifier system, it would be advantageous to use a lower amount of surfactant to reduce the cost and amount of surfactant, as well as reduce the waste discharged into the environment; and to improve the performance of the final products containing these (e.g., the film forming and water resistance properties will be improved in latex paints and skin irritation will be reduced for cosmetic products).

While conventional surfactants generally have one hydrophilic group and one hydrophobic group, recently a class of compounds having at least two hydrophobic groups and at least two hydrophilic groups have been introduced. These have become known as "gemini surfactants" in the literature (*Chemtech*, March 1993, pp 30–33), and *J. American Chemical Soc.*, 115, 10083–10090, (1993) and the references cited therein). Other gemini surfactant compounds, that is, compounds having at least two hydrophilic groups and at least two hydrophobic groups are also disclosed in literature but often are not referred to expressly as gemini surfactants.

An intensive study of gemini surfactants as emulsifiers has been made. From these studies, it has been found that gemini surfactants are unexpectedly effective emulsifiers when used at very low concentrations in comparison to conventional surfactants. This finding is reflected in superior detergency at very low concentrations. Other performance properties related to emulsification as mentioned above can be also improved using low concentrations of gemini surfactants.

SUMMARY OF THE INVENTION

In accordance with the present invention, it has been discovered that gemini surfactants of the type described and claimed herein can be extremely effective emulsifiers for oil-in-water emulsions at lower concentrations than that needed utilizing corresponding conventional surfactants. Furthermore, the detergency is also improved over that provided by conventional surfactants at these low concentration levels. These novel gemini surfactants are also able to lower the monomer concentration of anionic surfactants when the two are mixed in a blend. This results in less skin irritation and the other toxic side effects of anionics.

DETAILED DESCRIPTION OF THE INVENTION

The novel surfactant compounds of the invention are based on certain gemini surfactants. As used herein, the term "gemini surfactants" is intended to mean surfactants having at least 2 hydrophobic groups and at least 2 hydrophilic groups per molecule.

A number of the gemini surfactant are reported in the literature. See for example, Okahara et al., J. Japan Oil Chem. Soc. 746 (Yukagaku) (1989); Zhu et al., 67 JAOCS 7,459 (July 1990); Zhu et al., 68 JAOCS 7,539 (1991); Menger et al., J. Am. Chemical Soc. 113, 1451 (1991); Masuyama et al., 41 J. Japan Chem. Soc. 4,301 (1992); Zhu et al., 69 JAOCS 1,30 (January 1992); Zhu et al., 69 JAOCS 7,626 July 1992); Menger et al., 115 J. Am. Chem. Soc. 2, 10083 (1993); Rosen, Chemtech 30 (March 1993); and Gao et al., 71 JAOCS 7,771 (July 1994), and all of this literature incorporated herein by reference.

Also, gemini surfactants are disclosed by U.S. Pat. No. 2,374,354 to Kaplan; U.S. Pat. Nos. 2,524,218, and 2,530,147 to Bersworth (two hydrophobic tails and three hydrophilic heads); U.S. Pat. No. 3,244,724 to Guttmann; and U.S. Pat. No. 5,160,450 to Okahara, et al., all of which are incorporated herein by reference.

The gemini surfactants may be anionic, nonionic, cationic or amphoteric. The hydrophilic and hydrophobic groups of each surfactant moiety may be any of those known to be used in conventional surfactants having one hydrophilic group and one hydrophobic group. For example, a typical nonionic gemini surfactant, e.g., a bis-polyoxyethylene alkyl ether, would contain two polyoxyethylene alkyl ether moieties.

Since gemini surfactants are relatively quite new, few species have been reported or disclosed in the prior art. U.S. Pat. No. 5,534,197 to Scheibel teaches a method for the preparation of a nonionic gemini surfactant wherein the hydrophilic head is a sugar or carbohydrate while the hydrophobic head is a long chain alkyl, the two being joined by a short alkyl chain. U.S. Pat. Nos. 3,888,797 and 3,855,156 to Marumo disclose a number of nonionic gemini surfactant species in which the hydrophobic portion is comprised of a long chain lower alkyl or alkene moiety while the hydrophilic portion is comprised of an ethoxylate group. U.S. Pat. No. 4,892,806 to Briggs and European Patent No. 0,688,781A1 to Adams also disclose sugar-based hydrophilic heads joined to the hydrophobic counterpart by a short chain carbon bridge.

Each moiety would contain a hydrophilic group, e.g., polyoxyethylene, and a hydrophobic group, e.g., an alkyl chain.

Nonionic gemini surfactants which are useful in the present invention include those of the formula:

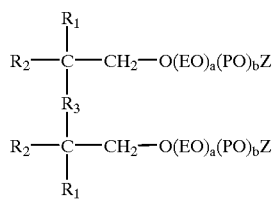

wherein $R_1$ is independently H or a $C_1$ to $C_{22}$ alkyl, $R_2$ is $C_6$ to $C_{22}$ alkyl and $R_3$ is $D_1$—$R_4$—$D_1$ or $R_4$—$D_1$—$R_4$ wherein $R_4$ is independently a $C_1$-$C_{10}$ alkyl group, —O—$R_5$—O—, or aryl, e.g. phenyl, and $D_1$ is independently —O—, an amide group [—C(O)N($R_6$)—], an amino group [—N($R_6$)—], —O—$R_5$—O—, or aryl, $(EO)_a(PO)_b$ is a polyether group and Z is a $C_1$-$C_4$ alkyl, or an alkylaryl or hydrogen. When $D_1$ is an amino group, then $R_6$ $R_4$, and $D_1$ can be part of a heterocyclic ring. $R_5$ and $R_6$ are a $C_1$ to $C_{10}$ alkyl, aryl, or alkylaryl.

Wherein EO represents ethyleneoxy-radicals, PO represents propyleneoxy-radicals, a and b are numbers of from 0 to 100, a is a number preferably from about 0 to about 30 and b is preferably from about 0 to 10, wherein a plus b is at least one, and the EO and PO radicals can be randomly mixed or in discrete blocks.

With respect to the formulae of this disclosure, the term "alkyl" includes substituted alkyl, especially the hydroxy-substituted derivatives thereof and also straight as well as branched chains. When Z is hydrogen, the gemini surfactants are nonionic and, when Z is a $C_1$ to $C_4$ alkyl, or an alkylaryl, they become low foaming nonionics.

The compounds of Formula I are more fully described in co-pending application U.S. Ser. No. 08/292,907 filed Aug. 19, 1994, now U.S. Pat. No. 5,643,864, the entire disclosure of which is incorporated herein by reference.

Particular gemini surfactants specifically useful in the present invention include nonionic surfactants of the formulae:

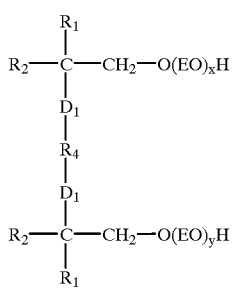

wherein $R_1$ represents H or is a $C_1$ to $C_{22}$ alkyl or aryl, $R_2$ is a $C_6$ to $C_{22}$ alkyl or aryl, x +y is a number between 1 and 200 and $R_4$ have been hereinbefore defined and $D_1$ is O, or N—$R_6$ wherein $R_6$ is $C_1$-$C_{10}$ alkyl, aryl or alkylaryl. Preferably, these compounds are more specifically represented by the formulae:

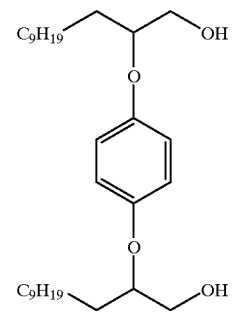

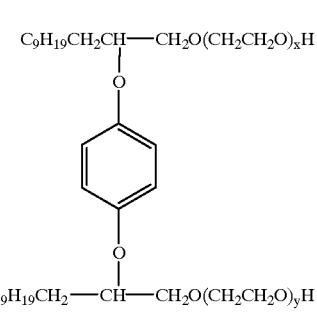

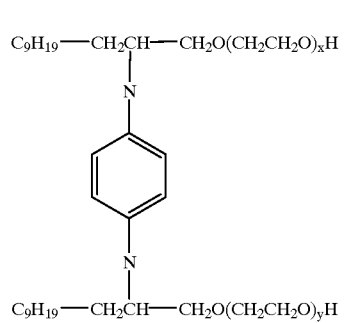

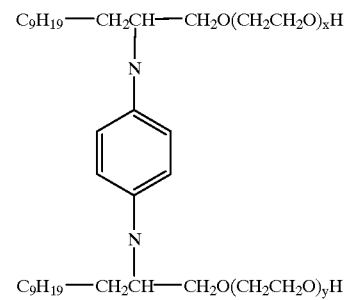

wherein x+y is a number between 1 and 200.

The gemini surfactants corresponding to the general formula 11 can be prepared using the following basic series of reactions:

The synthesis of α-halo acids is well known in the art; see for example Org. Syn. Coll. III p. 523; 848 which is hereby incorporated by reference.

I. One reaction scheme for the preparation of diether-coupled gemini surfactants is as follows:

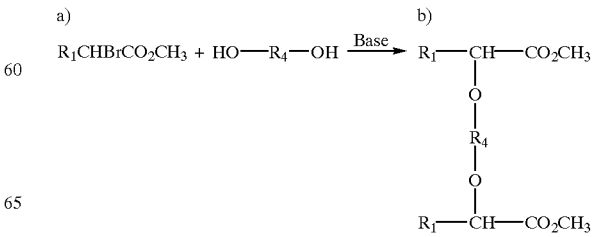

-continued

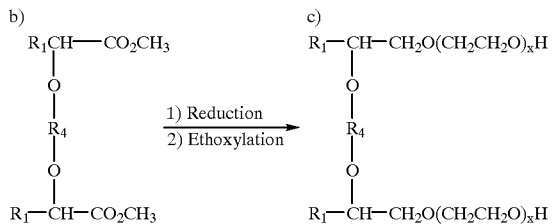

where $R_1$ is independently H or $C_1$–$C_{22}$ alkyl, aryl, or alkylaryl and x is a number of from 1–12. $R_4$ is independently any $C_1$–$C_{22}$ alkyl, aryl, or alkylaryl. Typical gemini nonionic-coupling diols include ethylene glycol, propylene glycol, butylene glycol, diethylene glycol, hexylene glycol, hydroquinone, xylenediol and the like.

II. Amine-coupled nonionic gemini surfactants are also useful according to the practice of the present invention and may be synthesized as follows:

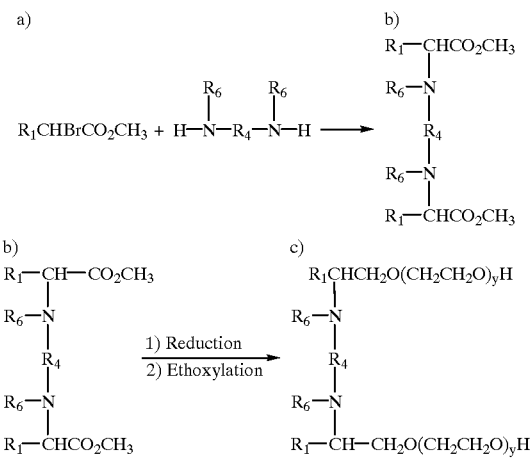

wherein $R_1$, $R_4$ and $R_6$ are hereinbefore defined and y is a number from 1 to 12. Typical amine nonionic gemini surfactants useful in the present invention comprise piperazine, methylamine; N,N$^1$-dimethylethylenediamine, xylenediamine, N N$^1$-dimethylbutanediamine, N,N$^1$-dimethylbutenediamine and N,N$^1$- dimethyl-1, 6-hexanediamine and urea.

This class of gemini surfactants as disclosed in the present invention can be used in providing improved emulsions which are operable at lower concentrations than the known surfactants of the prior art.

In the compounds used in the invention, many of the moieties can be derived from natural sources which will generally contain mixtures of different saturated and unsaturated carbon chain lengths. The natural sources can be illustrated by coconut oil or similar natural oil sources such as palm kernel oil, palm oil, soya oil, rapeseed oil, castor oil or animal fat sources such as herring oil and beef tallow. Generally, the fatty acids from natural sources in the form of the fatty acid or the triglyceride oil can be a mixture of alkyl radicals containing from about 5 to about 22 carbon atoms. Illustrative of fatty acids are caprylic ($C_8$), capric ($C_{10}$), lauric ($C_{12}$), myristic ($C_{14}$), palmitic ($C_{16}$), stearic ($C_{18}$), oleic ($C_{18}$, mono-unsaturated), linoleic ($C_{18}$, di-unsaturated), linolenic ($C_{18}$, tri-unsaturated), ricinoleic ($C_{18}$, mono-unsaturated) arachidic ($C_{20}$), gadolic ($C_{20}$, mono-unsaturated), behenic ($C_{22}$) and erucic ($C_{22}$). These fatty acids can be used per se, as concentrated cuts or as fractionations of natural source acids. The fatty acids with even numbered carbon chain lengths are given as illustrative though the odd numbered fatty acids can also be used. In addition, single carboxylic acids, e.g., lauric acid, or other cuts, as suited for the particular application, may be used as well as acids derived from Guerbet alcohols.

Where desired, the surfactants used in the present invention can be oxyalkylated by reacting the product with an alkylene oxide according to known methods, preferably in the presence of an alkaline catalyst.

For alkylation conditions and commonly used alkylating agents, see Amphoteric Surfactants Vol. 12, Ed. B. R. Bluestein and C. L. Hilton, *Surfactant Science Series* 1982, pg. 17 and references cited therein, the disclosures of which are incorporated herein by reference.

The surfactant compositions comprising the gemini nonionic compounds of the invention are extremely effective in aqueous solution at low concentrations as defined herein. The surfactants of the invention can be used in any amount needed for a particular application which can be easily determined by a skilled artisan without undue experimentation.

While the gemini surfactants of the invention can be used alone, it has been unexpectedly found that blends of the compounds of the invention with certain other conventional well known anionic, nonionic, cationic and amphoteric surfactants as well as polymers and enzymes provide synergistic effects with respect to critical micelle concentration (cmc) and surface tension reducing ability, and hence improved detergency.

Another important unexpected property of the Gemini Surfactants is their ability to significantly lower the ionic monomer concentration in mixtures of anionic/nonionic or anionic/nonionic/amphoteric or anionic/nonionic/cationic surfactant mixtures. It is well known that anionic monomers that are useful in personal care systems are responsible for higher toxicity and skin irritancy. Further, anionic surfactant monomers are responsible for the deactivation of enzymes used in detergent systems and moreover, being anionic, they interact strongly with proteins and enzymes thereby deactivating them. Also anionic surfactants very often absorb onto polymers used in detergents, wastewater treatment systems and conditioning agents used in personal care applications and so on, thereby changing the charged nature of such polymers. This results in the complete loss or poor performance for the polymers in their application.

The use of gemini surfactants in very small amounts in the presence of an anionic surfactant such as lauryl ether sulfate (ESY) dramatically reduces the anionic monomers. With the addition of less than a 0.1 mole fraction of the gemini surfactant, the anionic concentration in the mixture is brought down by greater than an order of magnitude of ten. This dramatic reduction of the anionic monomer at these very low concentrations will result in the elimination of any detrimental effects discussed above and brought about as a result of the anionic monomers. Therefore, this ability to decrease the anionic (or cationic) monomers in solution should provide performance enhancement for the surfactant or the surfactant polymer/enzyme mixtures and the other performance additives very often found in detergents, and personal care formulations.

The following examples are provided to more fully disclose, describe and set forth the elements and embodiments of the surfactants of the present invention. They are for illustrative purposes only, and it is recognized that minor changes or alterations may be made to the reaction parameters, reactants and isolation procedures that are not disclosed herein. However, to the extent that any such changes do not materially alter the final product or result, such alternative measures are deemed as falling within the spirit and scope of the invention as recited by the claims that follow.

EXAMPLE I

Preparation of Hydroquinone-Coupled Gemini Structure IV

A. Preparation of α-Bromolauric Acid Methyl Ester 1

Initially, α-bromolauric acid methyl ester was prepared as follows. Pure lauric acid (100 gm 0.5 mol) was dissolved in thionyl chloride (89 gm, 0.75 mol) at 55° C. under nitrogen. A large amount of hydrogen chloride gas was generated. When all the lauric acid was converted to acid chloride and there was no more HCl gas being generated after stirring for 2.5 hours, bromine (89.25 gm, 0.65 mol) was slowly added to the solution at room temperature. The reaction mixture was stirred for another 8 hours at 45° C. The reaction was then stopped by evaporating additional bromine at 80° C. by bubbling in nitrogen. The crude product, α-bromolauric acid chloride, was cooled to 0° under nitrogen. Pure methanol was then added very slowly to the acid chloride solution at 0° C. The temperature was not allowed to exceed 15° C. during this process. The final crude product, α-bromolauric acid methyl ester, was washed with water several times. The final product was extracted twice with hexane. The NMR results showed that the product was completely pure. The yield of the reaction was about 98% and may be summarized as follows:

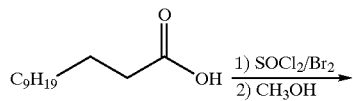

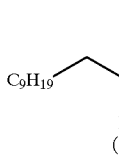

B. Preparation of Hydroquinone Bislauric Acid Methyl Ester (2)

Hydroquinone bislauric acid methyl ester was then prepared as follows. α-Bromolauric acid methyl ester (10.5 gm, 0.036 mol) and hydroquinone (1.8 gm, 0.016 mol) were stirred in dry dimethyl formamide (DMF) in the presence of sodium carbonate (4.0 g) at 50° C. overnight. The reaction was then stopped by adding acetone to precipitate the salt (sodium bromide) which was separated by filtration. The organic layer was collected and then rotovaporated. In order to remove the excess starting material, the crude product was stripped at 150° C. under reduced pressure for an hour. The final remaining product was immediately analyzed by NMR. The NMR spectrum showed that the crude product (6.5 g) was at least 95% pure. The reaction may be structurally summarized as follows:

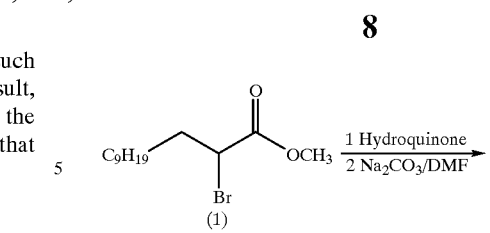

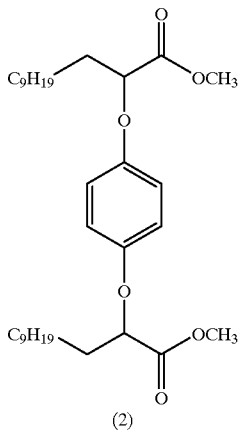

C. Preparation of Hydroquinone Bislauryl Alcohol (3)

The second nonionic gemini surfactant, hydroquinone bislauryl alcohol was prepared as follows. Hydroquinone bislauric acid methyl ester (5.25 g) was dissolved in dry tetrahydrofuran (THF) at 0° C. Lithium aluminum hydride (LAH) (1.07 g) was added to the solution slowly. A large amount of hydrogen was generated. The reaction temperature was then raised to 25° C. After the reaction was stirred for an hour at this temperature, the reaction was stopped by adding ethanol to deactivate the excess LAH. The solution was mixed with water and then acidified with concentrated HCl. The final product was extracted twice with ether. The crude hydroquinone bislauryl alcohol was dried under vacuum. The product is an oily liquid (4.2 g) whose NMR spectrum agrees with the structure of the expected gemini compound. The reaction can be summarized as follows.

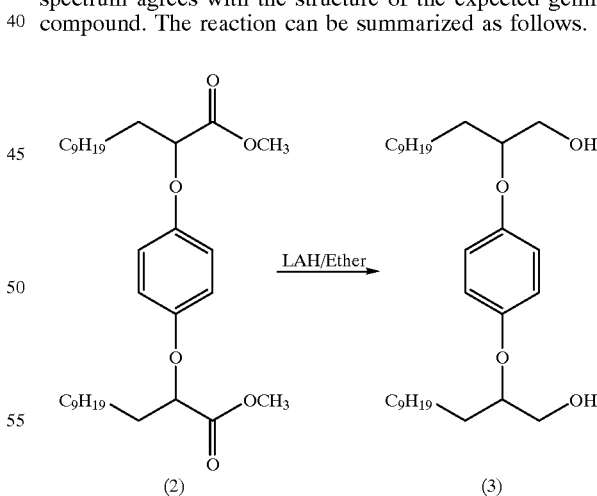

D. Preparation of Ethoxylated (20 EO) Hydroquinone Bislauryl Alcohol (Structure IV).

Hydroquinone bislauryl alcohol (478 gm., 1 mol) and 0.5 gm. of potassium hydroxide were added to a 2 gal. autoclave. The autoclave was degassed by pulling any gases present with a vacuum and releasing with nitrogen. The autoclave was heated to 140° C. and ethylene oxide (2 to 3 mols) was added rapidly allowing temperature to exotherm to 150–160° C. The remaining ethylene oxide (880 gm total) was added to a maximum of 53 psig. After 30 minutes of constant pressure and the weighed amount of ethylene oxide was added, the autoclave was cooled to 120° C. and vacuum stripped with a slight nitrogen sparge for 20 minutes. Finally, after cooling, acetic acid was added to lower the system to a pH 7. Analysis by NMR indicated that 20 mols EO were reacted.

EXAMPLE II

Preparation of Piperazine Coupled Gemini V

A. Preparation of Piperazine Coupled Ester (8)

α-Bromolauric acid methyl ester (24.1 gm, 0.082 m) was added to 2.8 gm.(0.03 m) piperazine dissolved in DMF at 50° C. Sodium carbonate (8 g) was also then added to the solution. After stirring at 94° C. for 12 hours under nitrogen, the reaction was stopped by cooling to room temperature. The inorganic salt was separated by filtration. The organic layer was stripped by distillation under reduced pressure at 180° C. The remaining material was analyzed by NMR. The NMR spectrum results agree with the expected structure of the final product. The yield of product was 14.5 gm.(94%). The reaction may be structurally summarized as follows:

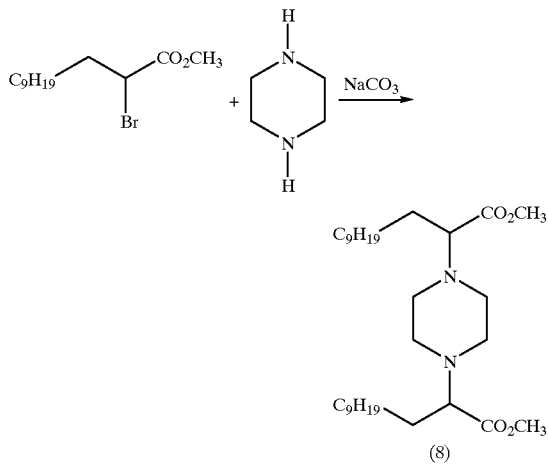

B. Preparation of Piperazine-Coupled Laurylalcohol (9)

To 10.2 gm. (0.02 m) of the piperazine-coupled lauryl ester (8) (10.2 gm; 0.02 m) dissolved in 50 ml THF, 1.7 (0.045 m) lithium aluminum hydride was added slowly at 10° C. The reaction was allowed to warm to room temperature. The reaction was quenched by drowning the mixture in water and adjusting the pH to 10. After extraction with ethyl acetate and concentrating it, the product (8.2 gm.) was isolated. The NMR spectrum agrees with the expected structure. Infrared spectroscopy spectra shows the absence of any carbonyl bonds. The reaction may be summarized as follows.

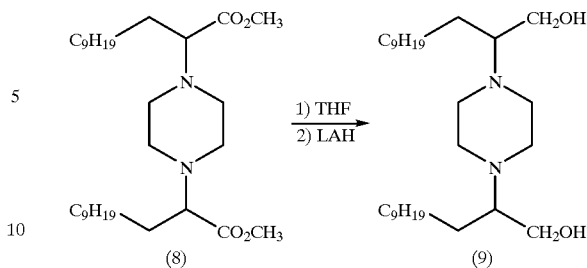

C. Preparation of Piperazine Coupled Ethoxylate V

Potassium hydroxide (1 gm.) was added to 454 gm. (1.0 m) piperazine-coupled lauryl alcohol (9) followed by the addition of 50 moles of ethylene oxide (2200 gm.). The mixture was heated to 50° C. and more ethylene oxide was added at 55 psig until another 2200 gm. is added. The reaction was cooled and then neutralized with acetic acid. The NMR spectrum indicates addition of 50 moles ethylene oxide. The compound may be structurally represented as follows.

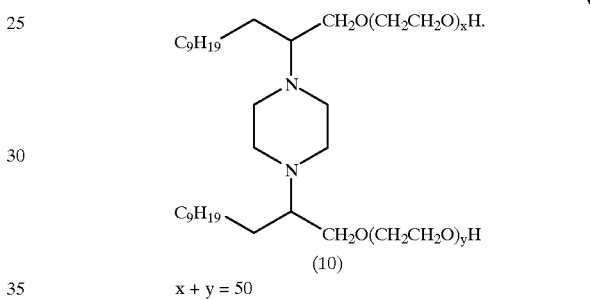

$x + y = 50$

The anionic surfactant compounds of the present invention are large molecules which consequently are characterized by low mobility and do not easily penetrate barriers such as synthetic and biological membranes. When formulated as personal care or household cleaning products, these surfactants produce solutions with extremely low surface tension values that exhibit superior surface active characteristics. Their low mobility, their inability to penetrate membranes to any large degree and excellent cleaning ability render them well adapted for shampoo formulations, facial soaps and other personal care products as they exhibit extremely low irritancy when in contact with the eyes and skin.

The surfactants of this invention afford superior foaming characteristics and enhanced surface tension reduction properties. This unusually high surface activity for these molecules is a result of their unique structure; the presence of two optimally spaced hydrophobic chains and hydrophilic groups.

When the surface properties for the nonionic gemini surfactant compounds of the invention were compared to the corresponding conventional nonionic surfactants, the novel compounds of the invention showed two unexpected surface active properties; unusually low critical micelle concentration (cmc) and $pC_{20}$ values in aqueous media. These properties are a measure of the tendency of the surfactant to form micelles and adsorb at the interface, and consequently, reduce surface tension.

This unusually high surface activity for these molecules is a result of their unique structure; the presence of two optimally spaced hydrophobic chains and hydrophilic groups.

This molecular structure provides energetically favorable decreases in the free energy of adsorption and micellization through the favorable distortion of water structure, and at the same time, provides a "close packed" arrangement at the interface. This is reflected by the relatively low surface area per molecule that is unexpected from the molecular dimensions for the molecule. The area per molecule for the compounds of the invention are comparable to corresponding conventional surfactants. The ability of the compounds of the invention to distort water structure through inhibition of crystalline or liquid crystalline phase formation in bulk phase and at the same time to pack closely on adsorption at the interface is contrary to conventional wisdom. This again demonstrates the uniqueness of the molecular design for these compounds which is very critical to providing the unexpected exceptional surface and performance properties.

The exceptional surface activity and unique structural features of the surfactants of the present invention provide two other important performance properties that can have immense practical application in industry. One is their hydrotropicity which is the ability of organic substances to increase the solubility of other insoluble organic substances in water, and two, solubilization, the ability to dissolve water insoluble organic compounds into aqueous surfactant solutions above their cmc levels. The compounds of the invention, because of their very low cmc values, are efficient solubilizers. This latter property will not only allow the formulation of homogeneous water insoluble materials, but also will enhance the surface activity of other surfactants whose low water solubility restrict their use. These novel surfactants of the invention are far better than comparable conventional surfactants in hydrotroping and solubilizing properties.

Because of their unusually high surface activity, coupled with their hydrotropicity and solubilization properties, compounds of this invention will provide exceptionally high performance properties, at very low concentrations, in practical applications such as detergency emulsification, solubilization, dispersancy, hydrotropicity, foaming and wetting. In addition, due to their extremely low monomer concentration at standard use levels and because of their extremely low cmc values, the use of lower concentrations of the compounds of the invention than conventional surfactants can provide extremely low or no irritancy in personal care applications as well as being non-toxic, biodegradable and environmentally friendly.

What we claim is:

1. A composition of matter comprising one or more surfactant compounds of the formula I:

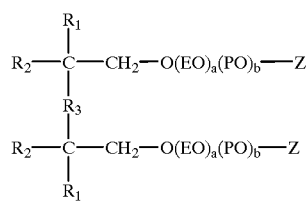

2. The composition of claim 1 comprising the compounds having the structure:

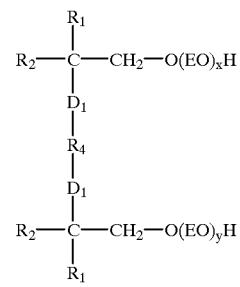

wherein $R_1$ is independently H or $C_1$ to $C_{22}$ alkyl or aryl, $R_2$ is a $C_6$ to $C_{22}$ alkyl or aryl, $R_4$ is hereinbefore defined and $D_1$ is independently —O— or N—$R_6$, wherein $R_6$ is $C_1$–$C_{10}$ alkyl, or alkylaryl and when $D_1$ is an amino, then $R_6$, $R_4$ and $D_1$ can be part of a divalent piperazine ring and x+y is a number between 2 to 200.

3. The composition of claim 1 further comprising compounds having the structure:

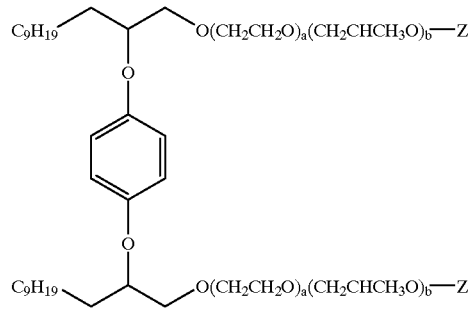

wherein a, b and Z have been hereinbefore defined.

4. The surfactant composition of claim 2 further comprising compounds having the structure:

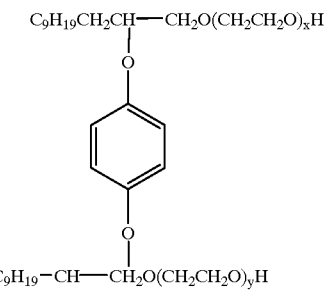

wherein x and y are whole numbers of from about 1 to 22.

5. The surfactant composition of claim 2 further comprising compounds having the structure:

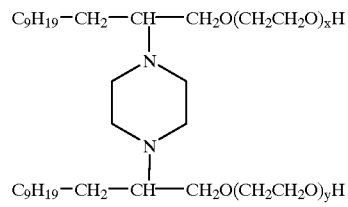

wherein x and y are whole numbers of from about 1 to 22.

6. A surfactant blend comprising the compounds or compositions of claim 3 and one or more additional compounds selected from the group consisting of anionic surfactants, nonionic surfactants, cationic surfactants, amphoteric surfactants, and mixtures thereof.

7. A surfactant blend comprising the compounds or compositions of claim 4 and one or more additional compounds selected from the group consisting of anionic surfactants, nonionic surfactants, cationic surfactants, amphoteric surfactants, and mixtures thereof.

8. A surfactant blend comprising the compounds or compositions of claim 5 and one or more additional compounds selected from the group consisting of anionic surfactants, nonionic surfactants, cationic surfactants, amphoteric surfactants, and mixtures thereof.

9. A cleaning composition comprising the compounds or compositions of claim 3.

10. A cleaning composition comprising the compounds or compositions of claim 4.

11. A cleaning composition comprising the compounds of claim 5.

12. A cleaning composition comprising the compounds or compositions of claim 6.

13. A cleaning composition comprising the compounds or compositions of claim 7.

14. A cleaning composition comprising the compounds or compositions of claim 8.

* * * * *

UNITED STATES PATENT AND TRADEMARK OFFICE
CERTIFICATE OF CORRECTION

PATENT NO. : 5,945,393
DATED : AUGUST 31, 1999
INVENTOR(S) : DAVID JAMES TRACY, RUOXIN LI, MANILAL S. DAHANAYAKE, JIANG YANG

It is certified that error appears in the above-identified patent and that said Letters Patent is hereby corrected as shown below:

In claim 1, after the last line thereof insert - - wherein $R_1$ is independently H or $C_1$ to $C_{22}$ alkyl or aryl, $R_2$ is a $C_6$ to $C_{22}$ alkyl or aryl, and $R_3$ is $D_1$- $R_4$ – $D_1$ or $R_4$ – $D_1$ – $R_4$;

wherein $R_4$ is independently a $C_1$-$C_{10}$ alkylene group, or arylene group;

wherein $D_1$ is indepently –O-, an amide group denoted – $C(O)N(R_6)$-, an amino group denoted –$N(R_6)$- or O-$R_5$-O-;

$R_5$ and $R_6$ are $C_1$-$C_{10}$ alkylene, arylene or alkylarylene; and when $D_1$ is an amino, then $R_6$, $R_4$ and $D_1$ can be part of a divalent piperazine ring;

$(EO)_a(PO)_b$ is a polyether group wherein EO is an ethoxy unit and PO is a propoxy unit;

Z is a $C_1$-$C_4$ alkyl, alkylaryl or hydrogen; and a and b are whole integers from 0 to 100 and a+b is at least 1. - -

Signed and Sealed this

Twenty-eighth Day of November, 2000

Attest:

Q. TODD DICKINSON

Attesting Officer        Director of Patents and Trademarks